US010259205B2

(12) United States Patent
Hisada et al.

(10) Patent No.: US 10,259,205 B2
(45) Date of Patent: Apr. 16, 2019

(54) VEHICULAR RESIN GLASS

(71) Applicant: AISIN SEIKI KABUSHIKI KAISHA, Kariya-shi, Aichi-ken (JP)

(72) Inventors: Naoto Hisada, Anjo (JP); Akiko Ishida, Inazawa (JP); Masashi Ishida, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 102 days.

(21) Appl. No.: 15/134,887

(22) Filed: Apr. 21, 2016

(65) Prior Publication Data

US 2016/0312526 A1 Oct. 27, 2016

(30) Foreign Application Priority Data

Apr. 22, 2015 (JP) ................. 2015-087173

(51) Int. Cl.
*B32B 27/36* (2006.01)
*B60J 1/00* (2006.01)
*B60J 7/00* (2006.01)

(52) U.S. Cl.
CPC ............ *B32B 27/36* (2013.01); *B32B 27/365* (2013.01); *B32B 2605/006* (2013.01); *B32B 2605/08* (2013.01); *B60J 1/00* (2013.01); *B60J 7/00* (2013.01)

(58) Field of Classification Search
None
See application file for complete search history.

(56) References Cited

U.S. PATENT DOCUMENTS

| | | | |
|---|---|---|---|
| 6,495,261 B1 * | 12/2002 | Gagliardi .......... | B32B 17/10018 296/190.1 |
| 2004/0033675 A1 | 2/2004 | Fleming et al. | |
| 2009/0136730 A1 | 5/2009 | Nakano et al. | |
| 2010/0151210 A1 * | 6/2010 | Shimatani ............. | A47F 3/0434 428/192 |
| 2016/0075111 A1 * | 3/2016 | Dixon ............... | B32B 17/10036 428/172 |

FOREIGN PATENT DOCUMENTS

| | | |
|---|---|---|
| CN | 103313865 A | 9/2013 |
| CN | 103707743 A | 4/2014 |
| JP | 5-213630 | 8/1993 |

(Continued)

OTHER PUBLICATIONS

Office Action issued in Chinese Application No. 201610186341.1 dated Jan. 3, 2018.

(Continued)

*Primary Examiner* — Laura C Powers
(74) *Attorney, Agent, or Firm* — Finnegan, Henderson, Farabow, Garrett & Dunner, LLP (57) ABSTRACT

Vehicular resin glass includes: a heat ray reflection coating; a resin glass substrate that covers the heat ray reflection coating; a frame portion that covers a circumferential edge portion of the heat ray reflection coating; and a shield portion that is provided between the resin glass substrate and the heat ray reflection coating and extends from the circumferential edge portion of the heat ray reflection coating over an inner circumferential end of the frame portion.

2 Claims, 6 Drawing Sheets

(56) References Cited

FOREIGN PATENT DOCUMENTS

| JP | 2008-094087 A | 4/2008 |
|----|---------------|--------|
| JP | 4860919 | 1/2012 |
| JP | 2012-180533 | 9/2012 |
| JP | 2013-92551 | 5/2013 |
| WO | WO 2011/096150 A1 | 8/2011 |
| WO | WO2015/166874 A1 | 11/2015 |

OTHER PUBLICATIONS

Chinese Office Action issued in Application No. 201610186341.1 dated Jan. 3, 2018.
Office Action issued in corresponding Japanese patent application No. 2015-087173 dated Jan. 22, 2019.

\* cited by examiner

VEHICULAR RESIN GLASS

CROSS REFERENCE TO RELATED APPLICATIONS

This application is based on and claims priority under 35 U.S.C. § 119 to Japanese Patent Application 2015-087173, filed on Apr. 22, 2015, the entire contents of which are incorporated herein by reference.

TECHNICAL FIELD

This disclosure relates to vehicular resin glass, and particularly relates to vehicular resin glass suitable for a sunroof.

BACKGROUND DISCUSSION

As the glass adopted in a window portion of a vehicle, glass having a function of suppressing a temperature rise caused by sunlight incident on the inside of the vehicle is adopted. Vehicular glass is required to be reduced in weight in order to improve the fuel efficiency of the vehicle, and resin glass having the function of suppressing a temperature rise has been proposed to be used. JP 2013-92551A (Reference 1) discloses a proposal of a resin glass having a laminated coating in which high-refractive-index thin coatings and low-refractive-index thin coatings are alternately laminated in a resin glass substrate. In the resin glass, the number of laminated layers is adjusted in accordance with the refractive index of the high-refractive-index thin coatings and the refractive index of the low-refractive-index thin coatings. Accordingly, visible light is transmitted and ultraviolet rays and infrared rays are reflected by the laminated coating.

In a case where such resin glass is adopted in a window portion of a sunroof of a vehicle, a frame portion hiding a motor, rails, and the like which open and close the window portion is provided throughout an outer circumference of the resin glass. As a method of manufacturing resin glass provided with such a frame portion, it is possible to exemplify a method in which a transparent resin is injection-molded on a heat ray reflection coating such as the laminated coating disclosed in Reference 1, and then, a resin which becomes the frame portion is injection-molded on an outer surface of the heat ray reflection coating.

However, in a case of manufacturing resin glass through injection molding, distortion sometimes occurs in a portion of the heat ray reflection coating facing the frame portion due to the pressure or the temperature applied during the injection molding of the resin forming the frame portion. When distortion occurs in the heat ray reflection coating, the distorted portion of the heat ray reflection coating is irradiated with light, thereby resulting in an interference fringe. Consequently, visual comfort is deteriorated when the vehicular resin glass is seen from the inside of the vehicle. Thus, an improvement has been required to be made.

SUMMARY

Thus, a need exists for vehicular resin glass which is not susceptable to the drawback mentioned above.

Vehicular resin glass according to an aspect of this disclosure includes a heat ray reflection coating, a resin glass substrate that covers the heat ray reflection coating, a frame portion that covers a circumferential edge portion of the heat ray reflection coating, and a shield portion that is provided between the resin glass substrate and the heat ray reflection coating and extends from the circumferential edge portion of the heat ray reflection coating over an inner circumferential end of the frame portion.

A method of manufacturing vehicular resin glass according to another aspect of this disclosure includes forming a shield portion in a circumferential edge portion on one surface of a heat ray reflection coating, forming a resin glass substrate which covers one surface of the heat ray reflection coating and the shield portion, and forming a frame portion which covers the circumferential edge portion of the heat ray reflection coating. The shield portion extends from the circumferential edge portion of the heat ray reflection coating over an inner circumferential end of the frame portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
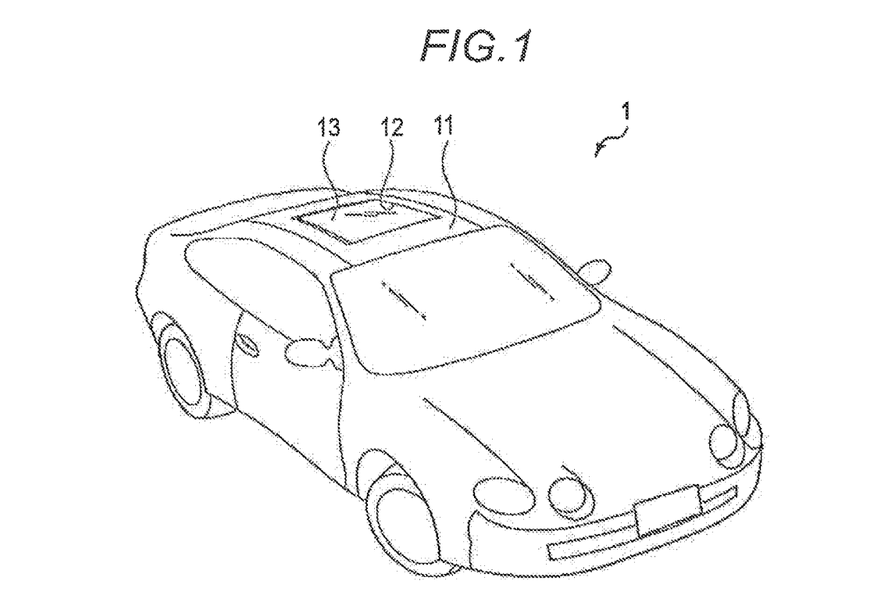
FIG. 1 is a perspective view of a vehicle provided with vehicular resin glass of an embodiment disclosed here.

Description will be given regarding vehicular resin glass of an embodiment disclosed here with reference to the drawings. FIG. 1 is a perspective view of a vehicle provided with the vehicular resin glass of the embodiment disclosed here. A vehicle 1 includes a roof panel 11 configured to form the ceiling. The roof panel 11 has an opening portion 12 for a sunroof. The opening portion 12 is formed to have a rectangular shape in the width direction of the vehicle 1 and in the forward-rearward direction of the vehicle 1. Vehicular resin glass 13 is attached to the opening portion 12.

The roof panel 11 includes the opening portion 12; and a motor, rails, and the like (not illustrated). The vehicular resin glass 13 is drivably attached to the opening portion 12. The motor is driven so as to perform an opening-closing operation of the vehicular resin glass 13 provided in the roof panel 11.

Figure 2:
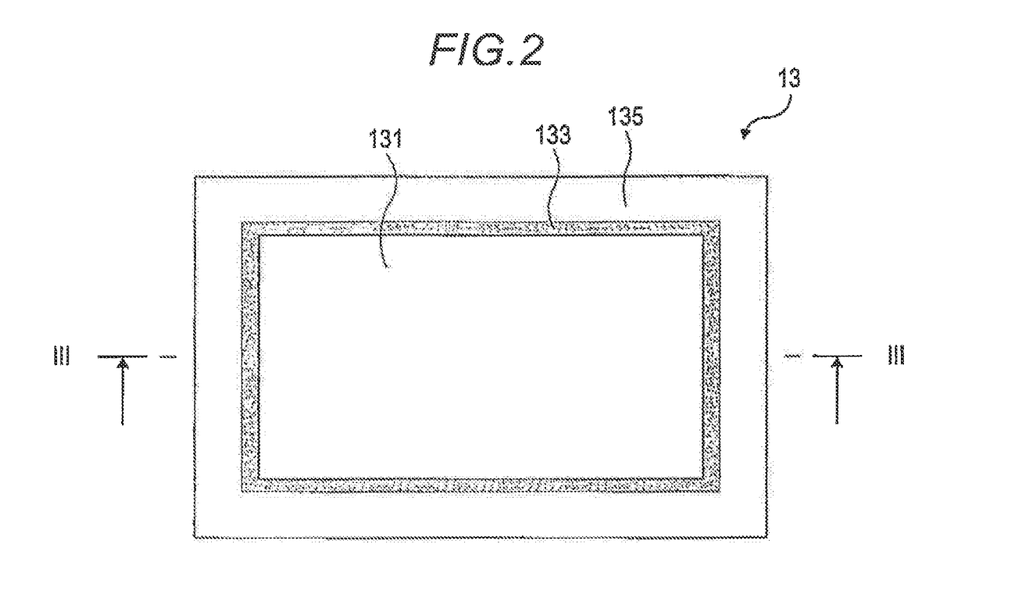
FIG. 2 is a bottom view of the vehicular resin glass of the embodiment disclosed here.
Figure 3:
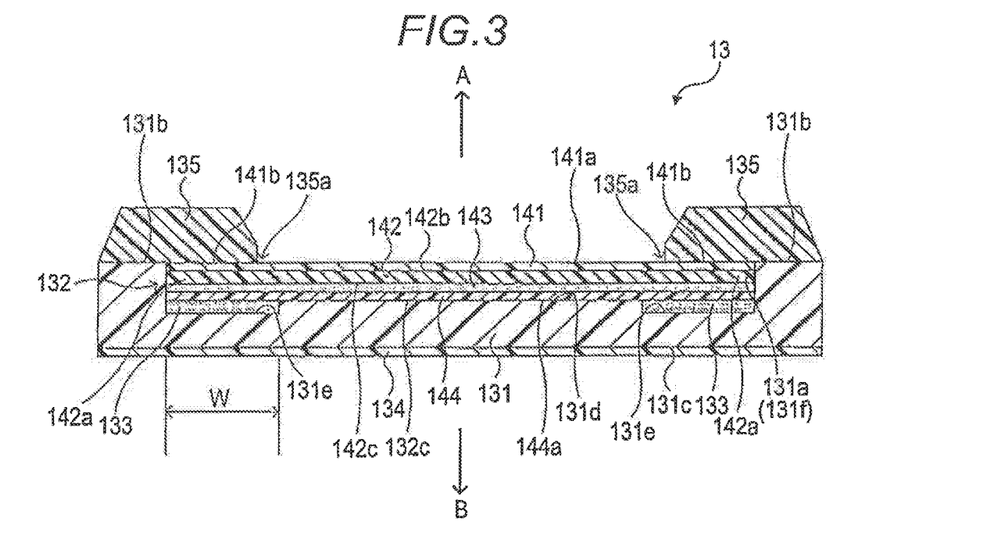
FIG. 3 is a cross-sectional view of the vehicular resin glass of the embodiment disclosed here taken along line III-III.

FIG. 2 is a bottom view of the vehicular resin glass 13 of the embodiment disclosed here. FIG. 3 is a cross-sectional view of the vehicular resin glass 13 illustrated in FIG. 2 taken along line III-III. The vehicular resin glass 13 includes a resin glass substrate 131, a laminated film 132, a shield portion 133, a hard coat layer 134, and a frame portion 135. The arrow A illustrated in FIG. 3 indicates a direction facing the inside of the vehicle 1, and the arrow B indicates a direction facing the outside of the vehicle.

The resin glass substrate 131 includes a storage portion 131a. The storage portion 131a is formed in a recessed manner with respect to an outer circumferential surface 131b of the resin glass substrate 131. A recess portion 131e formed in a recessed manner with respect to a central portion of the bottom surface 131d is provided in a bottom surface 131d of the storage portion 131a along a circumferential wall 131f of the storage portion 131a. The laminated film 132 is formed in the storage portion 131a, and the shield portion 133 is formed in the recess portion 131e. A substantially flat surface is formed throughout an outer surface of the laminated film 132 from an outer circumferential surface 131b of the circumferential edge portion surrounding the storage portion 131a of the resin glass substrate 131. In the resin glass substrate 131, the hard coat layer 134 is formed on a surface 131c on a side opposite to the outer circumferential surface 131b where the frame portion 135 is formed. It is favorable that the resin glass substrate 131 is formed from a resin, for example, a polycarbonate resin, an acrylic resin, and the like.

The laminated film 132 includes a herd coat film 141 serving as a protective coating, a heat ray reflection film 142 serving as a heat ray reflection coating, an adhesive layer 143, and a resin film 144. It is preferable that the thickness of the laminated film 132 ranges from 80 μm to 380 μm. The hard coat film 141 is formed from an organic material and is provided on a surface 142b of the heat ray reflection film 142 in order to improve the surface hardness and the like. The hard coat film 141 may be formed by being applied to the surface 142b or may be formed by being pasted thereon.

The heat ray reflection film 142 is provided with the adhesive layer 143 on a surface 142c on a side opposite to the surface 142b. The heat ray reflection film 142 is formed with an organic-based multilayer film in which high-refractive-index layers having a high refractive index and low-refractive-index layers having a low refractive index are alternately laminated. For example, the heat ray reflection film 142 is formed from a polyethylene terephthalate resin. When the heat ray reflection film 142 is formed from an organic-based material, the difference between the linear expansion coefficients of the resin configured to form the resin glass substrate 131 and the heat ray reflection film 142 becomes smaller than that in a case of a heat ray reflection film formed from a metal material. In a case where a high-temperature resin is injection-molded on the heat ray reflection film formed from a metal material, as the injection-molded resin cools down, the heat ray reflection film shrinks, thereby being likely to peel off. In the present embodiment, the heat ray reflection film 142 formed from an organic material having a small difference between the linear expansion coefficients with respect to the resin configured to form the resin glass substrate 131 is adopted. Therefore, the heat ray reflection film 142 is unlikely to peel off from the resin glass substrate 131. It is preferable that the thickness of the heat ray reflection film 142 ranges from 25 μm to 50 μm.

The heat ray reflection film 142 transmits equal to or greater than 80% of visible light, for example, and blocks light having the wavelength longer than those of the near infrared ray and the near infrared ray of sunlight. Accordingly, light transmittance of the vehicular resin glass 13 is ensured. The heat ray reflection film 142 may be formed within a range in which the heat ray reflection film 142 is not in contact with the frame portion 135 on the outer surface of the resin glass substrate 131. However, since the resin glass substrate 131 is formed by injection-molding a resin on the heat ray reflection film 142, there is a possibility of positional misalignment due to pressure or the like during the injection molding. In the present embodiment, a circumferential edge portion 142a of the heat ray reflection film 142 is formed so as to face the frame portion 135 such that the positional misalignment of the heat ray reflection film 142 caused through the injection molding is tolerable. Accordingly, poor appearance of the vehicular resin glass 13 can be prevented, thereby improving the appearance. The heat ray reflection film 142 is not limited to being formed from a multilayer film as long as the heat ray reflection film 142 is formed from an organic-based material.

The adhesive layer 143 is provided between the heat ray reflection film 142 and the resin film 144. The adhesive layer 143 bonds the heat ray reflection film 142 and the resin film 144 together. An adhesive material to be adopted for the adhesive layer 143 is not particularly limited as long as the heat ray reflection film 142 and the resin film 144 can be bonded together. The shield portion 133 is formed in the circumferential edge portion on a surface 144a of the resin film 144. The resin film 144 is provided so as to bond the resin glass substrate 131 and the heat ray reflection film 142 together. The resin film 144 melts due to the temperature of the injection-molded resin so that the heat ray reflection film 142 is favorably bonded to the resin glass substrate 131 via the adhesive layer 143 and the resin film 144. It is particularly preferable that the resin film 144 is made from the same material as the resin glass substrate 131. For example, a polycarbonate film is adopted.

The shield portion 133 is provided between the resin glass substrate 131 and the heat ray reflection film 142. The shield portion 133 is formed to extend from the circumferential edge portion 142a over an inner circumferential end 135a of the frame portion 135. The shield portion 133 is formed by being printed on the circumferential edge of the laminated film 132 through screen printing, for example, so as to have a predetermined width W ranging from 8 mm to 12 mm, for example. The shield portion 133 is formed, for example, by printing a black ink on the laminated film 132. However, the color of the ink is not limited to black as long as a distorted portion of the heat ray reflection film 142 facing the frame portion 135 can be shielded from light. In a case of forming the shield portion 133 through screen printing, the shield portion 133 is printed by adopting a screen printing plate (not illustrated) in which a predetermined pattern is formed and pushing out an ink through an opening portion where the pattern is formed. The ink adopted in screen printing has heat resistance against the melting temperature of the resin configured to form the resin glass substrate 131 and has characteristics of not scattering around due to the injection pressure of the resin. Forming the shield portion 133 is not limited to screen printing.

The hard coat layer 134 may be formed by being applied to the surface 1310 of the resin glass substrate 131 or may be formed by being pasted thereon. The hard coat layer 134 is formed from an organic material. The hard coat layer 134 is formed on the surface 131c of the resin glass substrate 131 in order to improve the surface hardness and the like.

The frame portion 135 is formed throughout a circumferential edge portion 141b on a surface 141a of the hard coat film 141 from the outer circumferential surface 131b of the resin glass substrate 131. As a resin adopted for the frame portion 135, for example, a polycarbonate/acrylonitrile-butadiene-styrene copolymer resin (PC/ABS resin) is adopted. The frame portion 135 is a member used when attaching the vehicular resin glass 13 to the roof panel 11 and is provided in order to hide the motor, the rails, and the like which operate the resin glass substrate 131. The frame portion 135 is formed from a black resin. However, as long as the motor, the rails, and the like can be hidden from an occupant inside the vehicle and the appearance can be improved, the frame portion 135 is not limited to being formed from a black resin.

Figure 4:
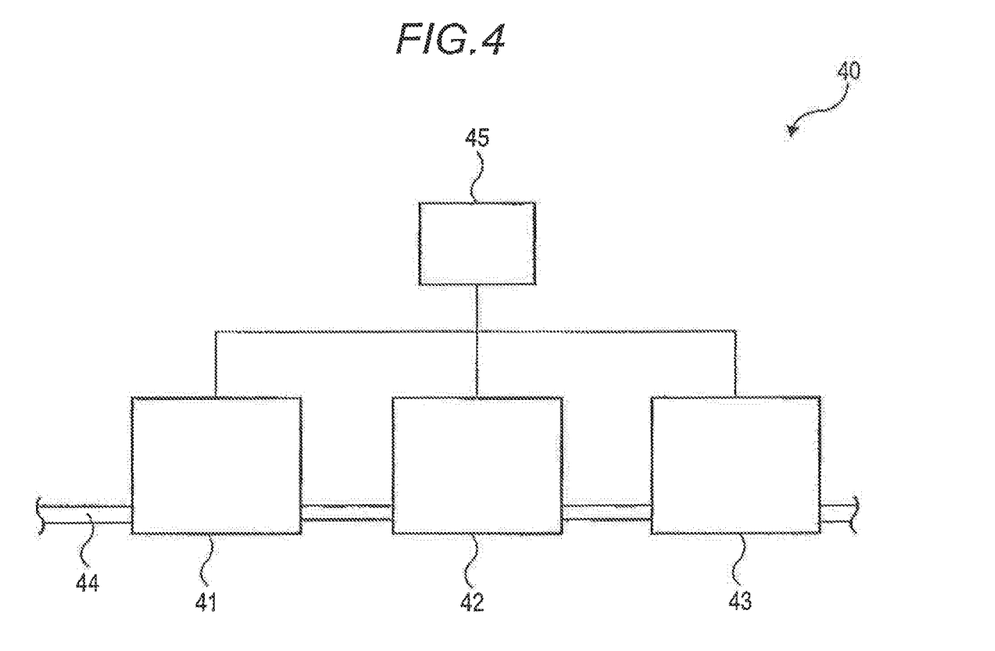
FIG. 4 is a schematic view illustrating a manufacturing apparatus of the vehicular resin glass of the embodiment disclosed here.

FIG. 4 is a schematic view illustrating a manufacturing apparatus 40 of the vehicular resin glass of the embodiment disclosed here. The manufacturing apparatus 40 include printing apparatus 41, an injection molding apparatus 42, a coating forming apparatus 43, a conveyance path 44, and a controller 45. The manufacturing apparatus 40 also has other functions, and description thereof will be omitted in the present embodiment.

The printing apparatus 41 prints the shield portion 133 on a circumferential edge portion 132a on a surface 132c of the laminated film 132 by adopting a screen printing plate which is formed to have a predetermined pattern, for example. The number of meshes of the screen printing plate is selected in accordance with the shape of the shield portion 133 to be printed.

Figure 5:
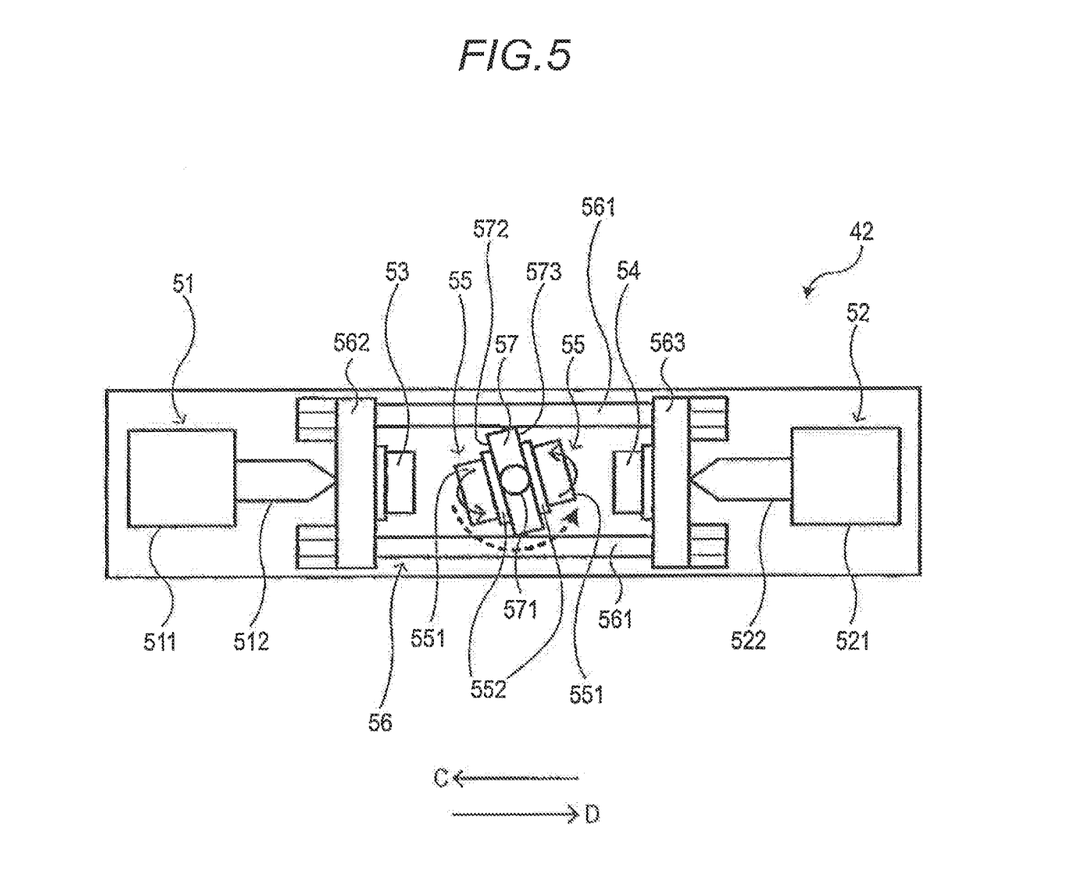
FIG. 5 is a schematic view of an injection molding apparatus of the embodiment disclosed here.

The injection molding apparatus 42 forms the resin glass substrate 131 by injection-molding a resin in a die and forms the frame portion 135 by injection-molding a resin on the outer circumferential surface 131b of the resin glass substrate 131. FIG. 5 is a schematic view of the injection molding apparatus 42 illustrated in FIG. 4. The injection molding apparatus 42 includes a first injection molding section 51, a second injection molding section 52, a first die 53, a second die 54, third dies 55 and 55, a the fastening section 56, and a rotary base 57.

The first injection molding section 51 includes a first resin container 511 and a first cylinder 512. The first resin container 511 stores a granular resin material. The first cylinder 512 includes a motor and a screw (not illustrated) and is configured to be extendable and contractible in the longitudinal direction of the injection molding apparatus 42, A nozzle (not illustrated) which injects a resin onto a side facing the first die 53 is formed in the first cylinder 512. The first cylinder 512 measures a predetermined amount of a resin material which is input from the first resin container 511 by causing the motor to rotate the screw. A heater (not illustrated) is disposed on the outer circumferential surface of the first cylinder 512, thereby performing heat-melting of the resin material which is input into the first cylinder 512 from the first resin container 511. The first cylinder 512 injects the heat-melted resin into the first die 53 and the third die 55 from the first cylinder 512.

The second injection molding section 52 includes a second resin container 521 and a second cylinder 522. The second resin container 521 stores a granular black resin material. The second cylinder 522 includes a motor and a screw (not illustrated) and is configured to be extendable and contractible in the longitudinal direction of the injection molding apparatus 42. A nozzle (not illustrated) which injects a resin onto a side facing the second die 54 is formed in the second cylinder 522. The second cylinder 522 measures a predetermined amount of a resin material which is input from the second resin container 521 by causing the motor to rotate the screw. A heater (not illustrated) is disposed on the outer circumferential surface of the second cylinder 522, thereby performing heat-melting of the resin material which is input into the second cylinder 522 from the second resin container 521. The second cylinder 522 injects the heat-melted resin into the second die 54 and the third die 55 from the second cylinder 522.

The first die 53 and the third die 55 are subjected to die fastening, thereby forming a cavity portion in which the resin glass substrate 131 is formed. The second die 54 and the third die 55 are subjected to die fastening, thereby forming a cavity portion in which the frame portion 135 is formed. The third die 55 includes a square tube 551 and a bottom well 552, and the square tube 551 is detachably attached to the bottom wall 552. The square tubes 551 and 551 are respectively attached to the bottom walls 552 such that opening portions thereof are reversible in directions of the solid arrows.

The die fastening section 56 includes a guide 561 and the fixing plates 562 and 563. The guide 561 includes two struts which are extendable and contractible, for example. The guide 561 guides an opening-closing operation of the first die 53 and the third die 55 and an opening-closing operation of the second die 54 and the third die 55. The guide 561 receives the die fastening force during die fastening. The first die 53 is fixedly attached to the fixing plate 562 on a side facing the third die 55, and the second die 54 is fixedly attached to the fixing plate 563 on a side facing the third die 55.

The rotary base 57 is rotatable centering around a rotary axis 571 in the direction indicated by the dashed arrow. The rotary base 57 is disposed so as to be movable in the longitudinal direction of the injection molding apparatus 42 by the guide 561. The third dies 55 and 55 are respectively attached to both side surfaces 572 and 573 of the rotary base 57. The rotary base 57 rotates centering around the rotary axis 571 in accordance with injection molding of the resin glass substrate 131 or injection molding of the frame portion 136 so that the third dies 55 and 55 can face the first die 53 and the second die 54.

In a case of injection-molding the resin glass substrate 131, the die fastening section 56 performs die fastening of the first die 53 and the third die 55 by driving the guide 561 and moving the rotary base 57 in a direction C. In a case of injection-molding the frame portion 135, the die fastening section 56 performs die fastening of the second die 54 and the third die 55 by driving the guide 561 and moving the rotary base 57 in a direction D. The resin glass substrate 131 having the frame portion 135 formed therein is detached from the third die 55 and is conveyed by the conveyance path 44.

The coating forming apparatus 43 forms the vehicular resin glass 13 by forming the hard coat layer 134 on the surface 1310 of the resin glass substrate 131. The conveyance path 44 conveys products which are respectively manufactured by the printing apparatus 41, the injection molding apparatus 42, and the coating forming apparatus 43. The products conveyed by the conveyance path 44 are the laminated film 132 in which the shield portion 133 is printed by the printing apparatus 41, the resin glass substrate 131 having the frame portion 135 formed by the injection molding apparatus 42, the vehicular resin glass 13 in which hard coating is performed by the coating forming apparatus 43, and the like. The controller 45 includes a central processing unit (CPU) and memories such as ROM and RAM (not illustrated), and the CPU controls each of the apparatuses such as the printing apparatus 41, the injection molding apparatus 42, and the coating forming apparatus 43 by executing various types of program stored in the memories.

Figure 6:
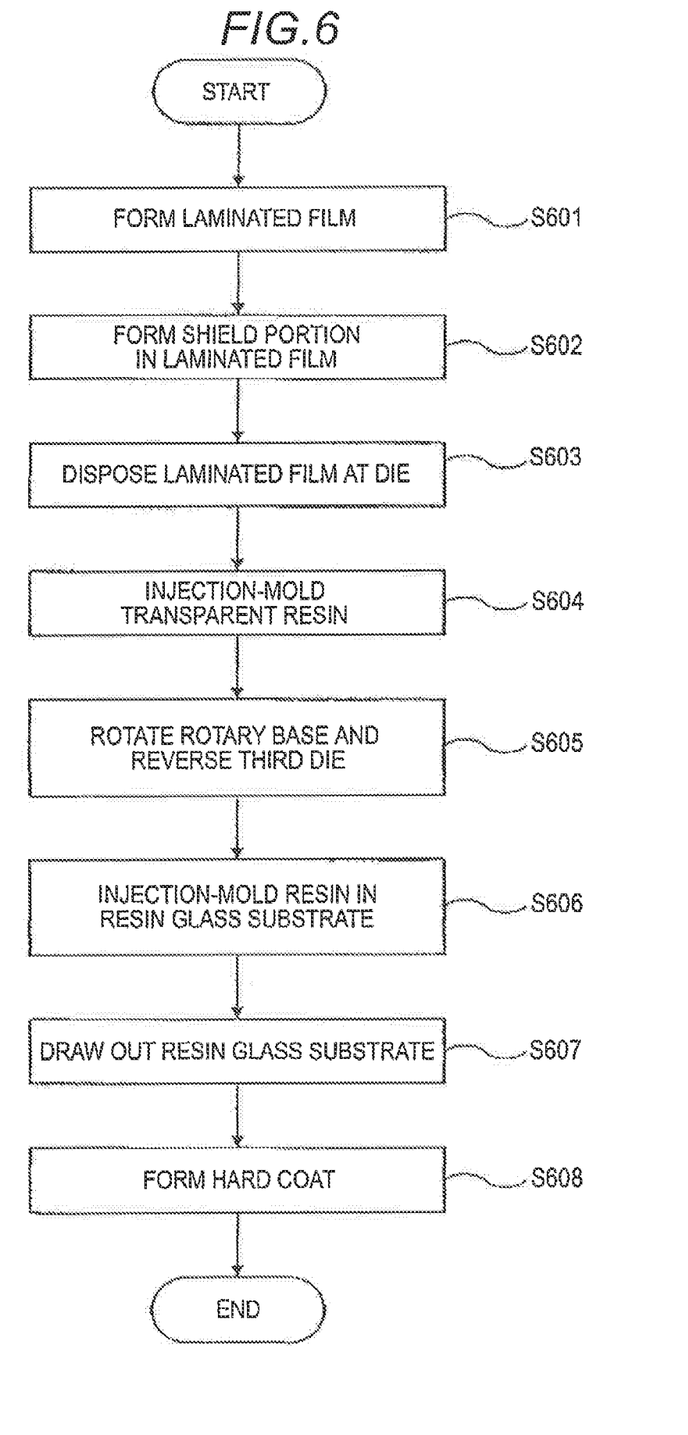
FIG. 6 is a flow chart illustrating a manufacturing step of the vehicular resin glass of the embodiment disclosed here.
Figure 7A:
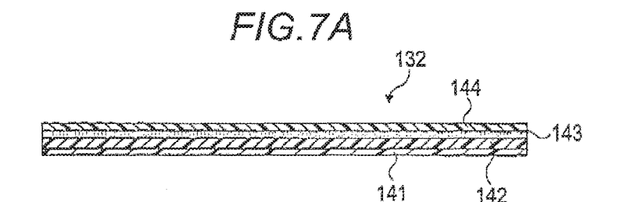
FIGS. 7A to 7D are schematic views respectively illustrating states of the vehicular resin glass in the manufacturing step of the embodiment disclosed here.
Figure 7B:
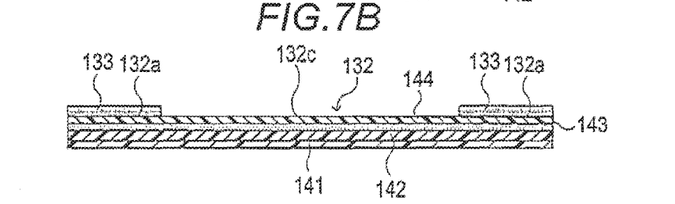
Figure 7C:
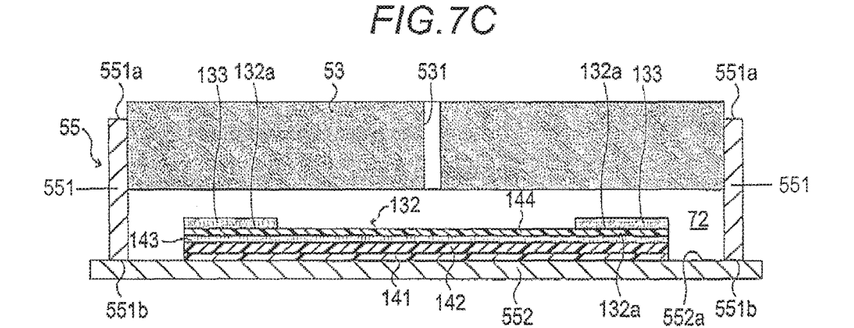
Figure 7D:
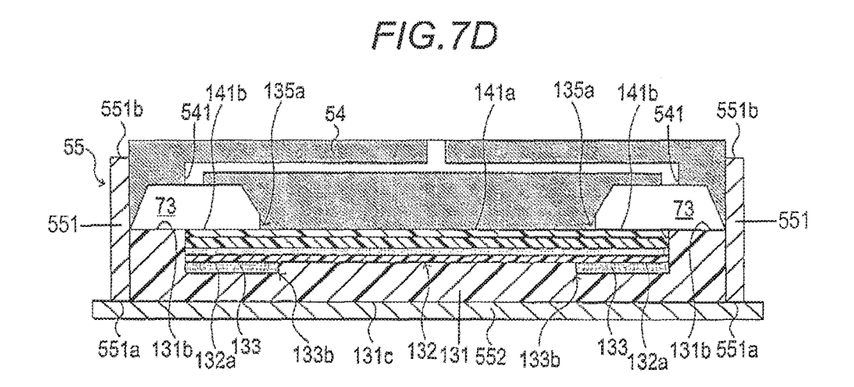

Subsequently, a method of manufacturing vehicular resin glass of the present embodiment will be described. FIG. 6 is a flow chart illustrating a manufacturing step of the vehicular resin glass 13 of the embodiment disclosed here. FIGS. 7A to 7D are schematic views respectively illustrating states of the vehicular resin glass 13 in the manufacturing step illustrated in FIG. 6. FIG. 7A illustrates a step of forming the laminated film 132, FIG. 7B illustrates a step of printing the shield portion 133 on the heat ray reflection film 142, FIG. 7C illustrates a step of injection-molding the resin glass substrate 131 in the third die 55, and FIG. 7D illustrates a step of injection-molding the frame portion 135, respectively. The manufacturing step of the vehicular resin glass 13 illustrated in FIG. 6 is performed by the controller 45 illustrated in FIG. 4.

In Step S601, the controller 45 causes the resin film 144 to be formed in the heat ray reflection film 142 so that the laminated film 132 is formed. Specifically, as illustrated in FIG. 7A, the controller 45 causes the resin film 144 to be formed via the adhesive layer 143 which is formed in the heat ray reflection film 142. The resin film 144 is formed from the same material as the resin glass substrate 131 and is adopted as a binder which bonds the heat ray reflection film 142 to the resin glass substrate 131.

The heat ray reflection film 142 is not heat-resistant to the temperature of the injection-molded resin. Therefore, in a case where a resin is directly injection-molded in the heat ray reflection film 142 without adopting the resin film 144, there is a possibility that the heat ray reflection film 142 is not favorably bonded to the resin glass substrate 131 and the heat ray reflection film 142 does not sufficiently exhibit the function. In the present embodiment, the heat ray reflection film 142 can be bonded to the resin glass substrate 131 without impairing the function of the heat ray reflection film 142 by injection-molding a resin after forming the resin film 144 in the heat ray reflection film 142. It is favorable that the adhesive layer 143 is formed before the controller 45 performs Step S601. The adhesive layer 143 may be formed in the heat ray reflection film 142 in advance. In Step S601, the heat ray reflection film 142 having the hard coat film 141 formed therein is adopted. However, the heat ray reflection film 142 having no hard coat film 141 formed therein may be adopted. In a case where the heat ray reflection film 142 having no hard coat film 141 formed therein is adopted, it is preferable that the hard coat film 141 is formed before Step S603.

Figure 8A:
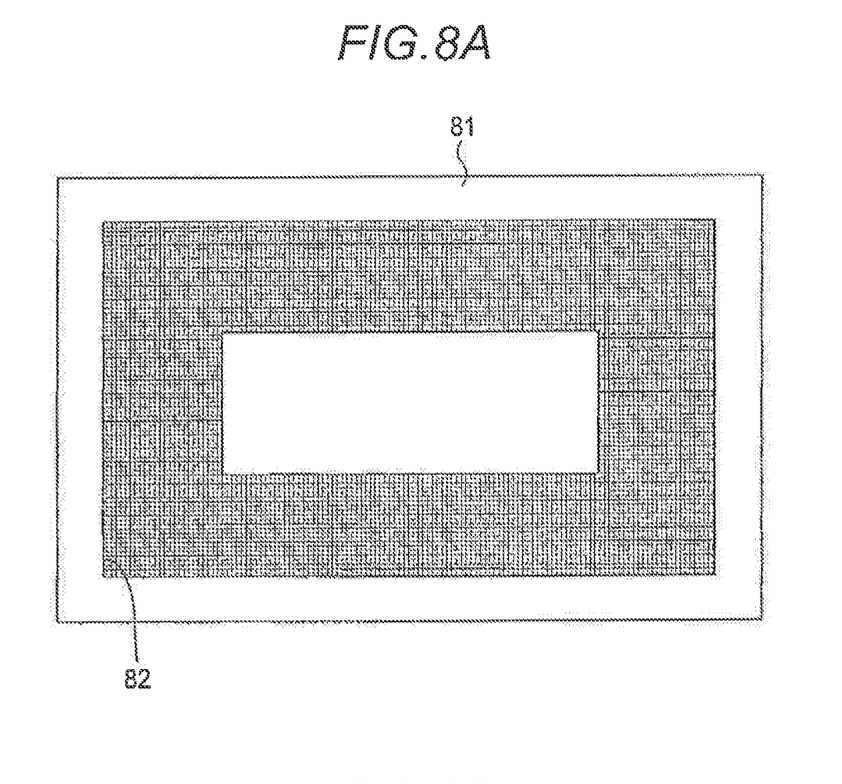
FIGS. 8A and 8B are schematic views of screen printing of the embodiment disclosed here.
Figure 8B:
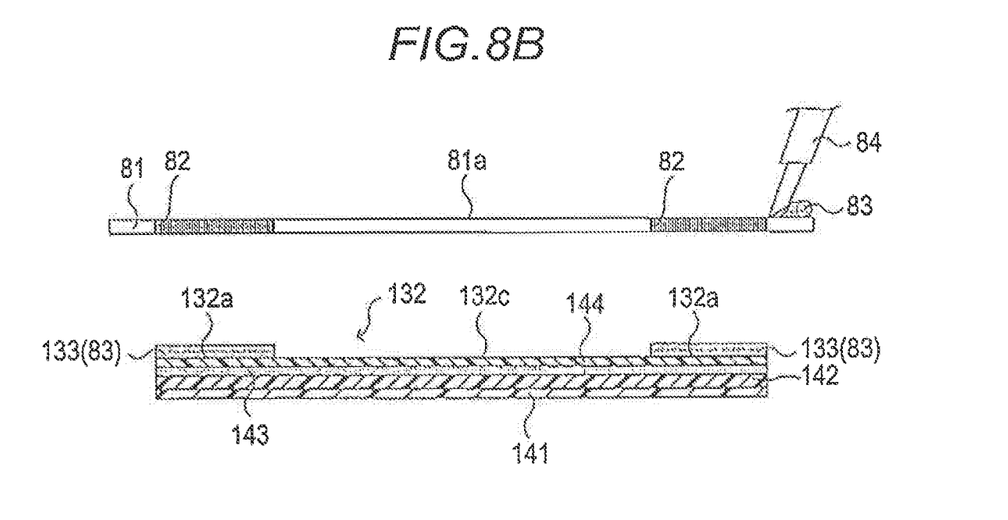

In Step S602, the controller 45 causes an ink to be applied to the circumferential edge portion 132a on the surface 132c of the laminated film 132, in the printing apparatus 41, thereby forming the shield portion 133 illustrated in FIG. 7B. FIG. 8A is a plan view illustrating an example of a screen printing plate 81, and FIG. 8B is a schematic view of screen printing. In the screen printing plate 81, an opening portion 82 is formed at a position facing the circumferential edge portion 132a on the surface 132c of the laminated film 132. Specifically, the opening portion 82 of the screen printing plate 81 is formed so as to apply an ink 83 to the circumferential edge portion 132a on the surface 132c of the laminated film 132 during screen printing. The laminated film 132 is disposed below the screen printing plate 81. In this case, the laminated film 132 is disposed so that the surface 132c having the shield portion 133 formed therein faces the screen printing plate 81.

As illustrated in FIG. 8B, a squeegee 84 scraping the ink 83 on the screen printing plate 81 moves on a surface 81a of the screen printing plate 81. Therefore, the ink 83 is pushed out through the opening portion 82, and the ink 83 is transferred to the circumferential edge portion 132a on the surface 1320 of the laminated film 132. Accordingly, the ink 83 is applied to the circumferential edge portion 132a on the surface 132c of the laminated film 132, thereby forming the shield portion 133. The controller 45 causes the laminated film 132 having the shield portion 133 formed therein to be conveyed to the injection molding apparatus 42, by using the conveyance path 44.

In Step S603, the controller 45 causes the laminated film 132 to be disposed at the third die 55, in the injection molding apparatus 42. The controller 45 causes the laminated film 132 to be disposed so that the hard coat film 141 faces an inner bottom surface 552a of the third die 55. The laminated film 132 may be pasted on the inner bottom surface 552a by using an adhesive or the like. The adhesive used in a case of pasting the hard coat film 141 has adhesion strength so that the hard coat film 141 can be peeled off from the inner bottom surface 552a. The laminated film 132 is pasted on the inner bottom surface 552a by using an adhesive, and thus, the laminated film 132 can be prevented from being positionally misaligned due to pressure and the like generated during the resin injection molding performed after the following step.

The laminated film 132 is formed so as to be smaller than the area of the inner bottom surface 552a of the third die 55. Specifically, the laminated film 132 is formed to have a size, for example, corresponding to 43% to 46% of the superficial area of the resin glass substrate 131, that is, the area of the inner bottom surface 552a surrounded by the square tube 551 of the third die 55. In a case where the laminated film 132 is formed to have a size substantially equal to the area of the inner bottom surface 552a surrounded by the square tube 551, the area ratio of the heat ray reflection film 142 with respect to the area of the resin glass substrate 131 increases. When the area ratio increases as described above, the difference between the linear expansion coefficient of the heat ray reflection film 142 and the linear expansion coefficient of the resin glass substrate 131 increases. Accordingly, a region of distortion occurring in the heat ray reflection film 142 when a resin for forming the frame portion 135 is injection-molded also increases, and thus, there is a possibility that an interference fringe increases as well. Therefore, it is preferable that the heat ray reflection film 142 is formed to be smaller than the area of the inner bottom surface 552a surrounded by the square tube 551.

In Step S604, the controller 45 causes the resin to be injection-molded in the third die 55, in the injection molding apparatus 42. Specifically, the controller 45 causes the die fastening section 56 to perform die fastening of the first die 53 and the third die 55 and causes the resin to be injection-molded in a cavity portion 72 formed by the first die 53 and the third die 55. As illustrated in FIG. 7C, the resin injected from the first cylinder 512 passes through an inflow passage 531 and fills the cavity portion 72.

The resin film 144 melts due to the pressure and the temperature of the resin injected into the cavity portion 72, and the injected resin is bonded to the heat ray reflection film 142 via the molten resin film 144 and the adhesive layer 143. Since the resin film 144 is formed from the same material as the injection-molded resin, even though the resin film 144 is hardened and is integrated with the resin glass substrate 131 after melting, it is possible to maintain the light transmittance of the resin glass substrate 131. The controller 45 causes the die fastening section 56 to open the first die 53 and the third die 55 after causing the resin to be injection-molded. FIG. 7D illustrates a state where the heat ray reflection film 142 is bonded to the resin glass substrate 131 via the adhesive layer 143 and the resin film 144.

In Step S605, the controller 45 causes the rotary base 57 to rotate and causes the third die 55 to be reversed. Specifically, the controller 45 causes the third die 55 in which the resin glass substrate 131 is injection-molded in Step S604 to face the second die 54 by rotating the rotary base 57. Then, as illustrated in FIG. 7D, the controller 45 causes the square tube 551 to be reversed such that an opening end 551a of the third die 55 in which the resin glass substrate 131 is injection-molded comes into contact with the bottom wall 552 and a fixing end 551b of the square tube 551 fixed to the bottom wall 552 becomes the opening end. Accordingly, the hard coat film 141 is positioned on the opening portion side of the third die 55, and the surface 131c of the resin glass substrate 131 is disposed so as to face the inner bottom surface 552a.

In Step S606, the controller 45 causes the resin to be injection-molded throughout the circumferential edge portion of the laminated film 132 from the outer circumferential surface 131b of the resin glass substrate 131 so that the frame portion 135 is formed, in the injection molding apparatus 42. Specifically, the controller 45 causes the die fastening section 56 to perform die fastening of the second die 54 and the third die 55 and causes the resin to be injection-molded in a cavity portion 73 formed by the second die 54 and the third die 55. As the die fastening of the second die 54 and the third die 65 is performed, the cavity portion 73 is formed throughout the circumferential edge portion 141b on the surface 141a of the hard coat film 141 from the outer circumferential surface 131b of the resin glass substrate 131. As illustrated in FIG. 7D, a plurality of inflow passages 541 are formed in the second die 54, and the resin injected from the second cylinder 522 passes through the plurality of inflow passages 541 and fills the cavity portion 73.

The cavity portion 73 is formed such that the inner circumferential end 135a of the frame portion 135 is positioned on the outer side closer than an inner circumferential end 133b of the shield portion 133. Accordingly, even in a case where distortion occurs in the circumferential edge portion 142a of the heat ray reflection film 142 facing the frame portion 135, the shield portion 133 shields the circumferential edge portion 142a in which distortion occurs, from reflection or light. Accordingly, the interference fringe is hidden by the shield portion 133, and thus, it is possible to improve the appearance of the vehicular resin glass 13. The controller 45 causes the die fastening section 56 to open the second die 54 and the third die 55 after the resin is injection-molded.

In Step S607, the controller 45 causes the resin glass substrate 131 having the frame portion 135 formed therein to be drawn out from the third die 55. The controller 45 may cause the third die 55 to be reversed and may cause a drawing-out portion (not illustrated) to draw out the resin glass substrate 131. The controller 45 causes the drawn-out resin glass substrate 131 to be conveyed to the coating forming apparatus 43 by using the conveyance path 44.

In Step S608, the controller 45 causes the hard coat layer 134 to be formed on the surface 131c of the resin glass substrate 131, in the coating forming apparatus 43. The hard coat layer 134 may be formed through dry coating and may be formed by pasting the hard coat layer 134 onto the surface 131c of the resin glass substrate 131. In this manner, the vehicular resin glass 13 is formed.

As described above, in the present embodiment, between the resin glass substrate 131 and the heat ray reflection film 142, there is provided the shield portion 133 which extends from the circumferential edge portion 142a of the heat ray reflection film 142 over the inner circumferential end 135a of the frame portion 135. Accordingly, even in a case where distortion occurs in the circumferential edge portion 142e of the heat ray reflection film 142, the shield portion 133 shields the circumferential edge portion 142a from light so that the interference fringe is hidden. Therefore, it is possible to improve the appearance of the vehicular resin glass 13.

This concludes the description of the embodiment. However, disclosed here is not limited to the above-described embodiment, and various changes can be made without departing from the gist and the scope of disclosed here.

For example, in the above-described embodiment, the frame portion 136 is injection-molded by causing the third die 55 to be reversed after the resin glass substrate 131 is injection-molded. However, the method is not limited thereto as long as the resin glass substrate 131 and the frame portion 135 can be injection-molded.

According to the embodiment disclosed here, there is provided the shield portion which extends from the circumferential edge portion of the heat ray reflection coating over the inner circumferential end of the frame portion. Accordingly, even in a case where distortion occurs in the circumferential edge portion of the heat ray reflection coating, the shield portion shields the circumferential edge portion of the heat ray reflection coating facing the frame portion from light so that an interference fringe cannot be seen. Therefore, it is possible to improve the appearance or the vehicular resin glass.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that ail such variations, changes and equivalents which fall within the spirit and scope of the present invention as defined in the claims, be embraced thereby.

What is claimed is:

1. Vehicular plastic glazing comprising:
    a laminated film including a heat ray reflection coating having a first surface and an opposing second surface, a plastic film on the second surface of the heat ray reflection coating, an adhesive layer provided between the plastic film and the heat ray reflection coating and bonding the plastic film and the heat ray reflection coating, and a protective coating provided on the first surface of the heat ray reflection coating;
    a plastic glazing substrate that covers the plastic film;
    a frame portion that covers an edge portion of the laminated film; and
    a shield portion provided between the plastic glazing substrate and the plastic film,
    wherein the plastic glazing substrate has a storage portion in which a bottom surface is formed,
    wherein the laminated film is formed in the storage portion,
    wherein a recess portion is formed in a recessed manner with respect to a central portion of the bottom surface, and
    wherein the shield portion is formed in the recess portion.

2. The vehicular plastic glazing according to claim 1, wherein the heat ray reflection coating is formed from an organic material.

* * * * *